(12) United States Patent
Kawaguchi (10) Patent No.: US 8,044,990 B2
(45) Date of Patent: Oct. 25, 2011

(54) CAMERA CONTROLLER AND TELECONFERENCING SYSTEM

(75) Inventor: Takayoshi Kawaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1279 days.

(21) Appl. No.: 11/505,197

(22) Filed: Aug. 16, 2006

(65) Prior Publication Data

US 2007/0040903 A1    Feb. 22, 2007

(30) Foreign Application Priority Data

Aug. 17, 2005    (JP) ............................... P2005-236253

(51) Int. Cl.
*H04N 7/14* (2006.01)

(52) U.S. Cl. ................ 348/14.09; 348/14.05; 348/14.08; 348/14.11

(58) Field of Classification Search ................ 348/11–14
See application file for complete search history.

(56) References Cited

U.S. PATENT DOCUMENTS

| | | | |
|---|---|---|---|
| 5,686,957 A * | 11/1997 | Baker | 348/36 |
| 6,593,956 B1 * | 7/2003 | Potts et al. | 348/14.09 |
| 6,795,106 B1 * | 9/2004 | Cooper | 348/14.08 |
| 7,428,000 B2 * | 9/2008 | Cutler et al. | 348/14.11 |
| 2001/0055059 A1 * | 12/2001 | Satoda | 348/14.05 |

FOREIGN PATENT DOCUMENTS

| | | |
|---|---|---|
| JP | 5-56426 | 3/1993 |
| JP | 5-244587 | 9/1993 |
| JP | 9-307870 | 11/1997 |
| JP | 10-271475 | 10/1998 |
| JP | 2002 58004 | 2/2002 |
| JP | 2003-189273 | 7/2003 |
| JP | 2004 259215 | 9/2004 |
| JP | 2006-197505 | 7/2006 |

* cited by examiner

*Primary Examiner* — Christopher S Kelley
*Assistant Examiner* — Hee-Yong Kim
(74) *Attorney, Agent, or Firm* — Frommer Lawrence & Haug LLP; William S. Frommer; Thomas F. Presson (57) ABSTRACT

A teleconferencing system includes: a camera system for imaging a plurality of persons; a voice collector for capturing voices generated by a plurality of persons; and a transmitter for multiplexing an image signal acquired from the camera system and a voice signal acquired from the voice collector and transmitting a multiplexed signal via a communication line. The camera system includes: a camera; a driver for changing the viewing direction of the camera; and a camera controller for controlling the driver. The camera controller includes: a face position detection unit; a registration unit; a timing unit; a drive control unit; and a hold time control unit.

8 Claims, 4 Drawing Sheets

CAMERA CONTROLLER AND TELECONFERENCING SYSTEM

CROSS REFERENCES TO RELATED APPLICATIONS

The present invention contains subject matter related to Japanese Patent Application JP 2005-236253 filed in the Japanese Patent Office on Aug. 17, 2005, the entire contents of which are incorporated herein by reference.

BACKGROUND OF THE INVENTION

1. Field of the Invention

The present invention relates to camera controllers and teleconferencing systems, and more particularly, to a camera controller for controlling an imaging range of a camera provided with a driver for changing its viewing direction and a teleconferencing system having the camera controller.

2. Description of the Related Art

Recently, teleconferencing systems enabling multipoint conferences by transmitting and receiving voice and video data via a plurality of terminals placed at remote points have been receiving attention. This type of teleconferencing system has a camera having the function of changing its viewing direction and a camera controller for electronically controlling the viewing direction of the camera so as to image a speaker and transmit the obtained image signal to remote terminals.

When a participant in a conference starts to speak, the camera controller controls the viewing direction of the camera so that the speaker can be imaged by the camera. For example, the camera controller predicts a direction from which voices have emanated (hereinafter referred to as a voice direction) via a microphone for capturing voices and causes the camera to automatically pan toward the voice direction. Subsequently, the camera controller detects the contour of the speaker's face, and controls the tilt direction and zoom adjustment of the camera so that the face can be placed at the center of a screen. Thus, the speaker can be imaged by the camera.

A camera direction automatic controller for causing a camera to automatically track an earphone microphone with a lighted lamp has been proposed (see, for example, Japanese Unexamined Patent Application Publication No. 9-307870, paragraphs [0016] to [0030] and FIG. 1). Upon capturing the voice of a speaker, the earphone microphone with a lamp lights its lamp. All participants in a conference wear these earphone microphones. The camera direction automatic controller detects the position of an earphone microphone with a lighted lamp on the basis of image data transmitted from the camera and directs the camera toward the earphone microphone with a lighted lamp.

SUMMARY OF THE INVENTION

Here, even if voices are detected from a different position soon after the camera direction automatic controller has detected a voice direction and directed the camera toward the voice direction, the camera direction should not be changed soon to prevent excessive movement of an image. Accordingly, once a camera direction has been changed, known camera controllers are configured to hold the camera direction for a predetermined period even if the voice direction is changed afterward. However, if the camera controller has directed the camera toward an incorrect direction, the camera continues to deliver meaningless images in the incorrect direction.

Furthermore, since the face detection is performed after the camera has panned, the camera moves little by little until the detection of a face. This leads to an unsteady image.

Still furthermore, since the camera control is performed only when a voice direction is detected, the imaging of persons other than a speaker is not taken into consideration. Therefore, participants at remote locations cannot view the images of persons other than a speaker.

Thus, if a subject to be imaged is changed, known camera controllers cannot obtain images that participants at remote locations want to see, and take time to achieve a steady image. The above-described earphone microphone with a lamp has the same problems, because the lighting of the lamp is synchronized with a voice output.

The present invention has been made in view of the above-described background. It is desirable to provide a camera controller and a teleconferencing system that enable accurate and stable imaging of a randomly changing subject (speaker) to be imaged.

According to an embodiment of the present invention, there is provided a camera controller for controlling the imaging range of a camera provided with a driver for changing the viewing direction of the camera. The camera controller includes: a face position detection unit; a registration unit; a timing unit; a drive control unit; and a hold time control unit. The face position detection unit detects a human face position from an image signal obtained by the camera. The registration unit calculates face direction information on the basis of the result of the detection performed by the face position detection unit and information about the current viewing direction of the camera, and registers the calculated face direction information in a storage unit. The timing unit measures a hold time for which the viewing direction of the camera is held fixed and the imaging range of the camera is retained. In a case where the hold time has elapsed before the drive control unit has received voice direction information generated by a voice detector for detecting a direction from which the voice of a person to be imaged by the camera is coming, the drive control unit changes the viewing direction of the camera by controlling the driver in accordance with the voice direction information. In a case where the face position detection unit has not detected a human face in the imaging range moved in response to the change in the viewing direction of the camera, the hold time control unit sets the hold time to be shorter than that set in a case where the face position detection unit has detected a human face.

In the above-described camera controller, after the imaging range of the camera has been decided, the face position detection unit detects a human face position from an image signal obtained by the camera. The face direction information based on the result of the detection and information about the current viewing direction of the camera is generated and registered in the storage unit by the registration unit. In a case where the hold time for holding the imaging range has elapsed before the drive control unit has received voice direction information generated by a voice detector for detecting a direction from which the voice of a person to be imaged by the camera is coming, the drive control unit changes the viewing direction of the camera to a direction specified by the voice direction information by controlling the driver in accordance with the acquired voice direction information. The hold time is set after the viewing direction of the camera has moved and is measured by the timing unit. If the viewing direction of the camera has been changed by the voice direction information, the face position detection unit performs human face detection processing in the imaging range moved in response to the change in the viewing direction of the camera. The hold time control unit sets the hold time in accordance with the detection result. If a human face has not been detected, the hold time control unit sets the hold time to be shorter than that set in a case where a face has been detected.

According to an embodiment of the present invention, there is provided a teleconferencing system that includes: a camera system for imaging a plurality of persons; a voice collector for capturing voices generated by a plurality of persons; and a transmitter for multiplexing an image signal acquired from the camera system and a voice signal acquired from the voice collector and transmitting a multiplexed signal via a communication line. The camera system has a camera controller that includes: a face position detection unit; a registration unit; a timing unit; a drive control unit; and a hold time control unit.

In the above-described teleconferencing system, when the voice of a speaker is input via the voice collector, a voice detector detects a direction from which the voice of the speaker is coming and generates voice direction information. In the camera controller, if a hold time for holding the imaging range of the camera has elapsed, the drive control unit changes the viewing direction of the camera to a direction specified by the voice direction information by controlling a driver attached to the camera in accordance with the acquired voice direction information. If the face position detection unit has detected a human face in the imaging range moved by the voice direction information, the hold time control unit sets a long hold time. If the face position detection unit has not detected a human face in the imaging range moved by the voice direction information, the hold time control unit sets a short hold time.

In the present invention, when a direction from which the voice of a person to be imaged by a camera is coming is detected, drive control processing for changing the viewing direction of the camera so that an image can be obtained in the detected direction is performed. At that time, if a human face has been detected in the moved imaging range of the camera, a long hold time for holding the imaging range is set. If a human face has not been detected in the moved imaging range of the camera, a short hold time is set. Consequently, even if a person other than a speaker is incorrectly imaged, the imaging range can be rapidly moved. If a speaker is imaged, the state is retained for at least the hold time period. Accordingly, a randomly changing speaker can be accurately and stably imaged.

DESCRIPTION OF THE PREFERRED EMBODIMENTS

An embodiment of the present invention will be described with reference to the accompanying drawings. First, the concept of an embodiment of the present invention will be described. After that, the detailed description of the embodiment will be given.

Figure 1:
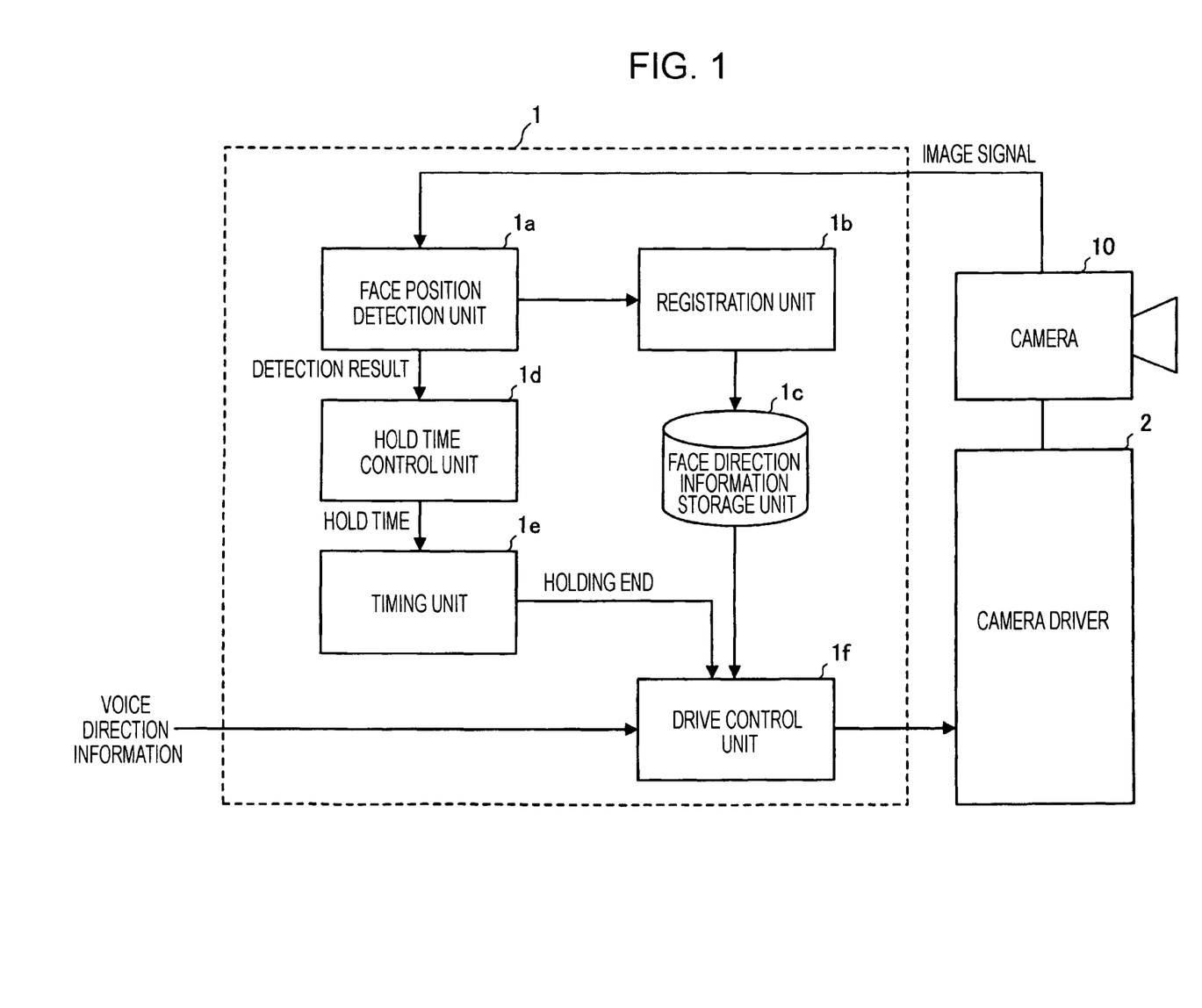
FIG. 1 is a conceptual diagram of an embodiment of the present invention.

FIG. 1 is a conceptual diagram of an embodiment of the present invention.

A camera controller 1 according to this embodiment acquires an image signal obtained by a camera 10 and voice direction information detected by a voice detector (not shown), and decides the viewing direction of the camera 10 on the basis of the acquired image signal and voice direction information, and then provides a driving instruction to a camera driver 2. The camera controller 1 is provided with a face position detection unit 1a, a registration unit 1b, a face direction information storage unit 1c, a hold time control unit 1d, a timing unit 1e, and a drive control unit 1f.

The face position detection unit 1a receives the image signal obtained by the camera 10, and performs face position detection processing using an image recognition method in a current imaging range. For example, the applicable image recognition method includes the steps of: detecting a fresh color distribution on the basis of color information included in the image signal; specifying an area including a face contour on the basis of the result of the detection; comparing the area with a plurality of face form templates stored in advance, each of which has face contour information and information about positions of eyes and mouth; and determining whether a face is present on the basis of the result of the comparison. If a face has been detected, this detection result information indicating that a face has been detected and face position information are output to the registration unit 1b. The detection result information is also output to the hold time control unit 1d.

The registration unit 1b calculates face direction information on the basis of the received face position information and information about the current viewing direction of the camera 10, and registers the calculated face direction information, and then outputs the registered face direction information to the face direction information storage unit 1c.

The face direction information storage unit 1c stores the received face direction information registered by the registration unit 1b.

The hold time control unit 1d sets a hold time for holding the imaging range of the camera 10. The drive control unit 1f drives the camera driver 2 on the basis of the voice direction information, whereby the imaging range is moved. The moved imaging range is held for the period of the hold time set by the hold time control unit 1d. Even if new voice direction information is acquired during this hold time period, the viewing direction of the camera 10 is not changed. Thus, by preventing excessive movement of the viewing direction of the camera 10, a steady image can be realized. The hold time control unit 1d acquires the result of the face position detection performed by the face position detection unit 1a after the imaging range of the camera 10 has been decided, and sets the hold time on the basis of the detection result. If a face has been detected, the hold time control unit 1d sets a long hold time so that the face to be imaged can be stably imaged. On the other hand, if a face has not been detected, the hold time control unit 1d sets the hold time to be shorter than that set when a face has been detected so that the imaging range of the camera 10 can be moved soon. The hold time to be set is decided in accordance with the system status as appropriate.

The timing unit 1e measures the hold time set by the hold time control unit 1d, and reports whether the hold time has been expired and the holding of the imaging range has been finished to the drive control unit 1f.

Upon acquiring the voice direction information about the direction of voices generated from a person to be imaged from the voice detector, the drive control unit 1f controls the viewing direction of the camera 10 on the basis of the voice direction information. The voice detector detects the voice direction by, for example, comparing the intensities of voices input into microphones placed at a plurality of locations. The drive control unit 1f determines whether the holding of the imaging range has been finished on the basis of the information transmitted from the timing unit 1e. If the holding of the imaging range has been finished, the drive control unit 1f outputs to the camera driver 2 an instruction for changing the viewing direction of the camera 10 to the direction specified by the voice direction information. At that time, the face direction information stored in the face direction information storage unit 1c is compared with the acquired voice direction information. If the face has been detected in the direction specified by the voice direction information, the drive control unit 1f decides the viewing direction of the camera 10 on the basis of the face direction information. That is, the viewing direction of the camera 10 is changed to the nearest position to the position at which the face has been detected. Thus, if a face position has been detected in advance, the imaging range can be rapidly decided. In addition, the imaging range of the camera 10 is not required to be moved little by little for the face position adjustment. If it has been detected from the comparison between the face direction information and the voice direction information that a person is present in the direction specified by the voice direction information, it can be considered that the reliability of the voice direction information is high. Accordingly, even if the viewing direction is currently being held, the hold time is shortened so that the viewing direction can be moved earlier. Thus, if the presence of a speaker can be detected with certainty, the speaker can be imaged without waiting for the hold time to expire. On the other hand, if the face position detection unit 1a cannot detect a face, the camera 10 is directed toward the direction specified by the voice direction information and is controlled to zoom out so that the imaging range can be expanded. Consequently, the surroundings of the position of the detected voice are imaged on a screen, and therefore participants in the conference at remote locations can easily grasp the situation. If the voice direction information cannot be acquired from the voice detector within a predetermined time period, that is, if nobody is speaking, the camera 10 is similarly controlled to zoom out so that the imaging range can be expanded. Consequently, participants who are not speaking are imaged on a screen, and therefore participants in the conference at remote locations can easily grasp the situation. For example, the participants in the conference at remote locations can visually grasp the situation and ask a certain person imaged on the screen to make a comment.

The operations of the camera controller 1 will be described.

The face direction information storage unit 1c stores a plurality of pieces of face direction information each of which has been calculated by the registration unit 1b using the face position information detected in the imaging range of the camera 10 by the face position detection unit 1a and the corresponding information about the viewing direction of the camera 10.

Upon acquiring from the voice detector the voice direction information indicating the direction from which a speaker's voice is coming, the drive control unit 1f compares the voice direction information with the face direction information stored in the face direction information storage unit 1c, and performs drive control processing for deciding the viewing direction of the camera 10 taking the hold time into account.

If the holding of the imaging range has been finished, and if the face direction information corresponding to the voice direction information is present, the drive control unit 1f controls the camera driver 2 on the basis of the voice direction information and the corresponding face direction information. Consequently, a speaker's face can be rapidly imaged. On the other hand, if the face direction information corresponding to the voice direction information is not present, the drive control unit 1f controls the camera driver 2 on the basis of the voice direction information. After the viewing direction of the camera 10 has been changed to the direction specified by the voice direction information, the face position detection unit 1a performs the face position detection processing. If a face position has been detected, the face direction information is updated by the registration unit 1b. In addition, a long hold time is set by the hold time control unit 1d so that the face of the speaker can be stably imaged. If a face position has not been detected, the hold time is set to be shorter than that set when a face position has been detected so that the viewing direction can be moved soon when voices from other positions are detected. Alternatively, if a face position has not been detected, the camera 10 may be controlled to zoom out so as to widely image in the voice detected direction.

If the holding of the imaging range has not been finished, the change of the viewing direction based on the voice direction information is not performed. However, if the face direction information corresponding to the voice direction information is present, and if a predetermined time has elapsed since the previous movement of the viewing direction, the viewing direction is changed on the basis of the face direction information and the voice direction information. Consequently, in a case where a speaker is present, the speaker can be rapidly imaged even if the hold time has not expired.

Furthermore, if the voice direction information has not been transmitted to the drive control unit 1f within a predetermined time period, the drive control unit 1f may control the camera 10 to zoom out so as to expand the imaging range.

Thus, if the viewing direction of the camera 10 is automatically moved after the direction from which a speaker's voice is coming has been detected, the hold time for holding the viewing direction is variably set, depending on whether a face has been detected in the moved imaging range. Consequently, if a face has been detected, the speaker can be stably imaged. If a face has not been detected, that is, if an incorrect direction has been selected, the viewing direction can be rapidly moved to another viewing direction. In addition, since not only the voice direction information but also the face direction information are used, images desired by participants in the conference at local locations can be imaged by the camera 10.

A camera system according to an embodiment of the present invention which is used for a teleconferencing system will be described.

Figure 2:
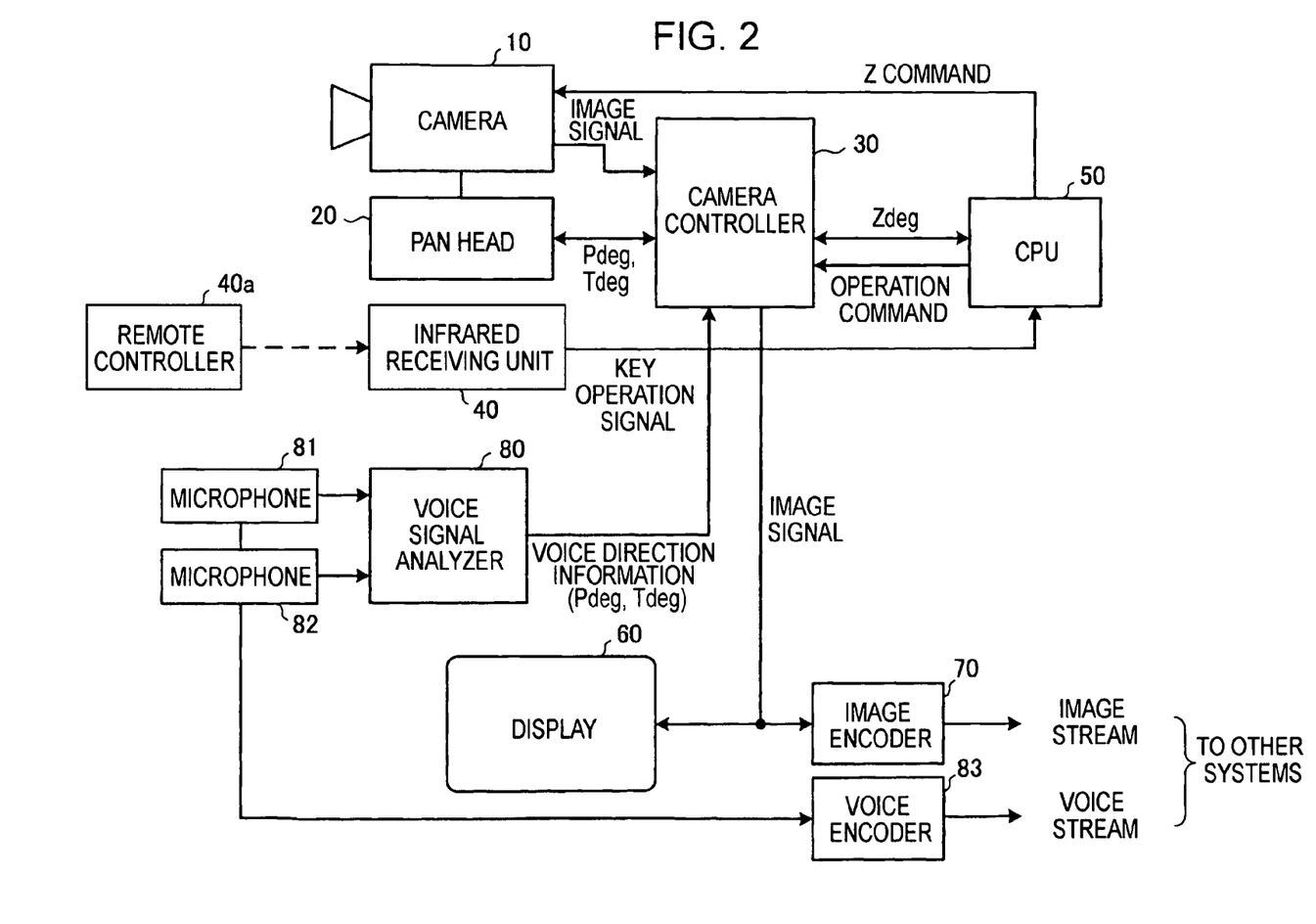
FIG. 2 is a system configuration diagram of a camera system according to an embodiment of the present invention.

FIG. 2 is a system configuration diagram of a camera system according to an embodiment of the present invention.

A camera system shown in FIG. 2 is used in a case where the camera 10 images a plurality of persons who are attending a conference. This camera system is provided with the following: the camera 10 having a zoom function; a pan head 20 for changing the viewing direction of the camera 10; a camera controller 30 for controlling the operation of the pan head 20; an infrared receiving unit 40 for receiving an infrared signal from a remote controller 40a; a CPU (Central Processing Unit) 50 for controlling the entire system; a display 60 for displaying obtained images; an image encoder 70 for performing compression coding upon an image signal; a voice signal analyzer 80 for analyzing a voice signal; microphones 81 and 82 for capturing voices; and a voice encoder 83 for performing compression coding upon a voice signal.

The viewing direction of the camera 10 is horizontally and vertically changed by the pan head 20. The focal length of a zoom lens attached to the camera 10 is controlled by a control signal (zoom command) transmitted from the CPU 50. The camera 10 transmits an obtained image signal to the camera controller 30. The pan head 20 receives from the camera controller 30 control information (Pdeg and Tdeg, which will be described later) about an instruction for horizontally and vertically controlling the viewing direction, and then moves in accordance with the values of Pdeg and Tdeg. In addition, the pan head 20 is configured to transmit the current values of Pdeg and Tdeg to the camera controller 30.

The camera controller 30 controls the operation of the pan head 20 in accordance with an operation command for performing pan and tilt operations which has been transmitted from the CPU 50. In addition, the camera controller 30 transmits the image signal received from the camera 10 to the display 60 and the image encoder 70.

The camera controller 30 has the following functions: the function of holding information about the face positions of a plurality of persons in a database, and controlling the pan head 20 and the zoom operation of the camera 10 in accordance with an operation command so that an arbitrary face can be automatically imaged at a predetermined scaling factor; the function of recognizing a person's face from an image signal acquired by the camera 10, and registering the information about the recognized face's position in the database or updating the information stored in advance in the database with the information about the recognized face's position; and the function of acquiring voice direction information and changing the viewing direction of the camera 10 to the direction specified by the acquired voice direction information. In order to realize the above-described functions, the camera controller 30 is configured to acquire the current values of Pdeg and Tdeg from the pan head 20, and acquire the current control value (Zdeg described later) for a zoom operation from the CPU 50, and control the zoom operation of the camera 10 by outputting the value of Zdeg to the CPU 50.

The infrared receiving unit 40 receives from the remote controller 40a an infrared signal for controlling the drive operation of the pan head 20 and the zoom function of the camera 10, and transmits a key operation signal corresponding to the infrared signal to the CPU 50. The CPU 50 controls the rotational motion of the pan head 20 and the zoom operation of the camera 10 by outputting an operation command regarding pan and tilt operations to the camera controller 30 and a zoom control signal to the camera 10 in accordance with the received key operation signal. The CPU 50 sometimes controls the zoom operation of the camera 10 in accordance with the value of Zdeg transmitted from the camera controller 30.

The display 60 receives the image signal acquired by the camera 10 and displays an image in accordance with the image signal. Consequently, a current image of a conference room or the like is displayed.

The microphones 81 and 82 capture voices of participants in the conference room where the camera 10 is in operation. The captured voice signals by the microphone 81 or 82 are input into the voice signal analyzer 80 and the voice encoder 83, and are then output as voices via a speaker (not shown). The voice signal analyzer 80 extracts a human voice from the received a plurality of voice signals, and predicts the direction from which the human voice has emanated, and then outputs voice direction information indicating the predicted direction to the camera controller 30. The camera controller 30 specifies the direction where a participant is speaking on the basis of the received voice direction information, and directs the camera 10 to the specified direction. Here, the values of Pdeg and Tdeg are provided as the voice direction information.

The image encoder 70 performs compression coding upon the image signal transmitted from the camera controller 30, thereby generating an image stream. The voice encoder 83 performs compression coding upon a voice signal transmitted from the microphone 81 or 82, thereby generating a voice stream. The generated image stream and voice stream are transmitted to a remote conference room via a communication line. In the remote conference room, the image and voice occurring in the conference room on the transmitting side are reproduced in real time. At the same time, image and voice streams generated in the remote conference room are transmitted from the remote conference room. Subsequently, an image and a voice are reproduced from the received image and voice streams via the display 60 and the speaker. Thus, a teleconference between conference rooms at remote locations can be achieved.

The control information (Pdeg, Tdeg, and Zdeg) used to decide the viewing direction of the camera 10 will be described.

Figure 3A:
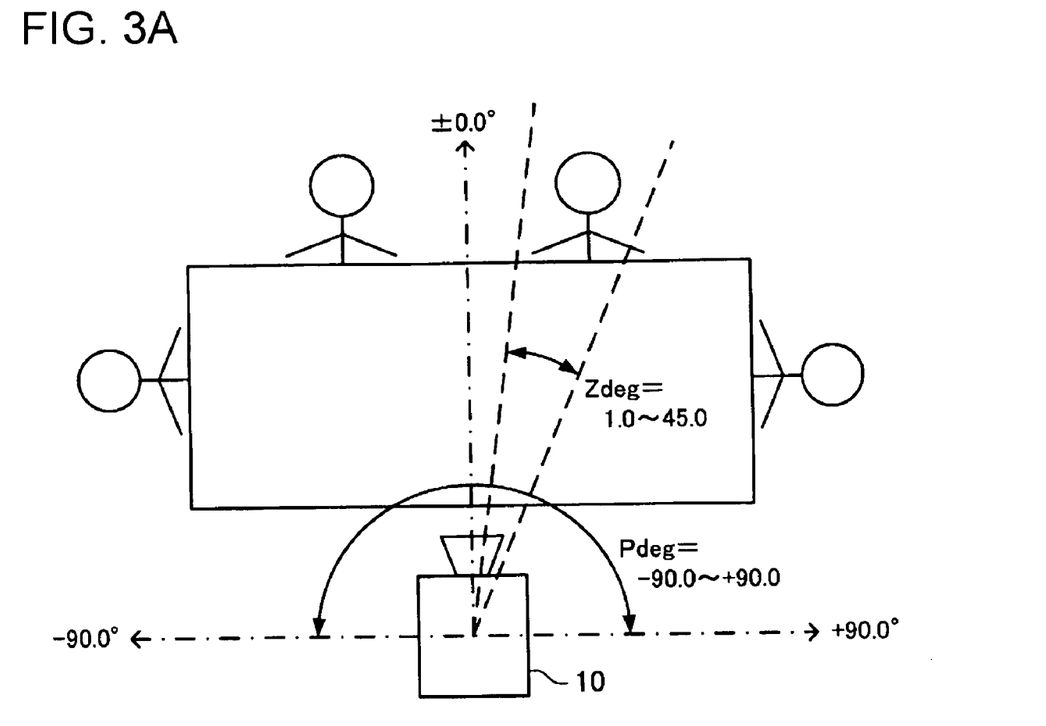
FIG. 3A is a diagram describing control information (Pdeg and Zdeg) about pan and zoom operations.
Figure 3B:
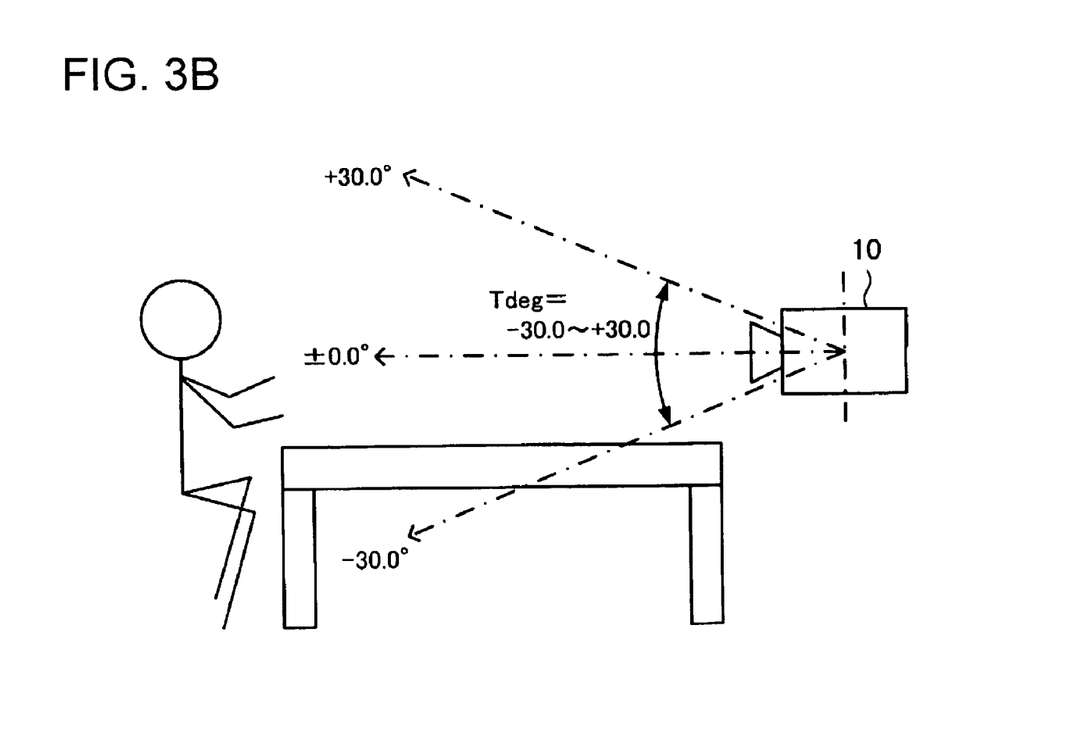
FIG. 3B is a diagram describing control information (Zdeg) about a tilt operation.

FIG. 3A is a diagram describing control information (Pdeg and Zdeg) about pan and zoom operations. FIG. 3B is a diagram describing control information (Zdeg) about a tilt operation.

In this embodiment, the control information about a pan operation is represented by the viewing direction of the camera 10 in the horizontal direction given as Pdeg in units of degrees. The control information about a tilt operation is represented by the viewing direction of the camera 10 in the vertical direction given as Tdeg in units of degrees. The control information about a zoom operation is represented by the zoom state of the camera 10 given as Zdeg in units of degrees. The horizontal rotational motion (pan operation) of the camera 10 is shown in FIG. 3A. The maximum horizontal rotation angle of the pan head 20 is set to, for example, 180°, and the angle (−90.0° to +90.0°) between the vertical line and a straight line that connects the center of rotation of the pan head 20 and the center of the face of a person to be imaged is set as the control information about the pan operation (Pdeg). The vertical rotational motion (tilt operation) of the camera 10 is shown in FIG. 3B. The maximum vertical rotation angle of the pan head 20 is set to, for example, 60°, and the angle (−30.0° to +30.0°) between the horizontal line and a straight line that connects the center of rotation of the pan head 20 and the center of the face of a person to be imaged is set as the control information about the tilt operation (Tdeg).

The control information (Zdeg) about the zoom operation is represented as the viewing angle of the camera 10 as shown in FIG. 3A. Referring to FIG. 3A, the viewing angle is set to the range from 1.0° to 45.0°. The smaller the value of this angle becomes, the more a subject is enlarged by a zoom-in operation performed by the camera 10.

The above-described control information is provided to a pan/tilt control unit 37 for controlling the pan, tilt, and zoom operations and a zoom control unit 51. The information about the face position of each person which is stored in a face position information database 31 is represented as the combination of the above-described angle information (Pdeg, Tdeg, Zdeg). The information about the zoom operation stored in the face position information database 31 is set as, for example, the viewing angle when the image of a face is enlarged to full screen.

The camera controller 30 in the camera system according to this embodiment will be described.

Figure 4:
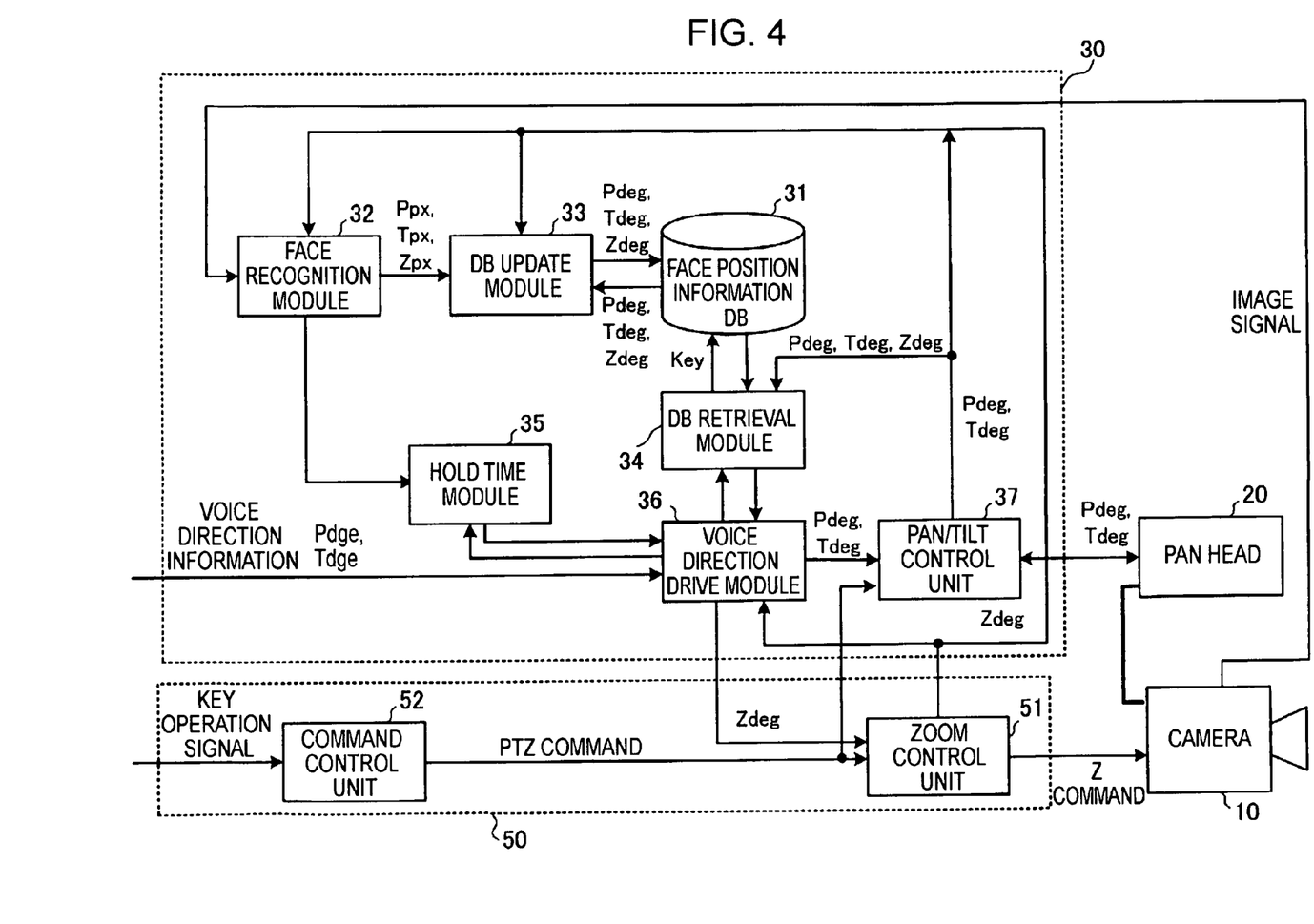
FIG. 4 is a block diagram showing camera control functions of a camera controller and a CPU.

FIG. 4 is a block diagram showing camera control functions of a camera controller and a CPU.

As shown in FIG. 4, the camera controller 30 is provided with the following: the face position information database 31; a face recognition module 32; a database update module 33; a database retrieval module 34; a hold time module 35; a voice direction drive module 36; and the pan/tilt control unit 37. The CPU 50 is provided with the zoom control unit 51 and a command control unit 52.

Control information used to control the rotational motion of the pan head 20 and the zoom operation of the camera 10 so that a participant's face image can be located in the center of a screen at a predetermined scaling factor is generated for each participant in a conference and is then stored in the face position information database 31. As will be described later with reference to FIG. 4, this control information is represented by Pdeg, Tdeg, and Zdeg. The Pdeg is data represented by the viewing direction of the camera 10 in the horizontal direction in units of degrees. The Tdeg is data represented by the viewing direction of the camera 10 in the vertical direction in units of degrees. The Zdeg is data represented by the zoom state of the camera 10 in units of degrees.

The face recognition module 32 detects a human face position from a digital image signal acquired by the camera 10 using an image recognition technique, and calculates face position information given as coordinates (Ppx, Tpx, Zpx), and then outputs the calculated face position information to the database update module 33. The detection result is also transmitted to the hold time module 35.

The database update module 33 converts the face position information (Ppx, Tpx, Zpx) calculated by the face recognition module 32 into the face position information in units of degrees, and registers the converted face position information in the face position information database 31. Alternatively, the database update module 33 updates the contents in the face position information database 31 on the basis of the face position information transmitted from the face recognition module 32, even if the camera 10 is in operation. More specifically, the database update module 33 converts the face position information (Ppx, Tpx, Zpx) given as coordinates which is stored in the face recognition module 32 to the face position information (Pdeg, Tdeg, Zdeg) in units of degrees, on the basis of the current values of Pdeg, Tdeg, and Zdeg. For example, if the current values of Pdeg, Tdeg, and Zdeg are −30.0, +10.0, and +40.0, respectively, the value of Pdeg at the left end of a currently acquired image becomes −30.0−40.0/2=−50.0, and the value of Pdeg at the right end becomes −30.0+40.0/2=−10.0, and the value of Tdeg at the upper end becomes +10.0+(40.0×3/4)/2=+25.0, and the value of Tdeg at the lower end becomes +10.0−(40.0×3/4)/2=−5.0. Accordingly, by making these values linearly correspond to the coordinate values of end portions of the image, the face position information (Ppx, Tpx, Zpx) given as coordinates can be converted into the face position information (Pdeg, Tdeg, Zdeg) in units of degrees.

The database retrieval module 34 is a functional block for controlling the viewing direction and zoom operation of the camera 10 using information stored in the face position information database 31. The database retrieval module 34 receives voice direction information from the voice direction drive module 36, and extracts from the face position information database 31 face position information (Pdeg, Tdeg, Zdeg) indicating a position near the direction specified by the received voice direction information, and then outputs the extracted face position information to the voice direction drive module 36.

The hold time module 35 is a counter that doubles as the hold time control unit 1d and the timing unit 1e. The hold time module 35 sets a counter value corresponding to the hold time. The hold time is set in accordance with whether, after the voice direction drive module 36 has changed the viewing direction of the camera 10, the face recognition module 32 can detect a face position on the basis of an image signal acquired by the camera 10. The counter is configured to count down in a predetermined cycle. When the counter value becomes zero, the hold time ends. Upon receiving a request from the voice direction drive module 36, the hold time module 35 transmits the counter value to the voice direction drive module 36.

Upon acquiring the voice direction information from the voice detector, the voice direction drive module 36 transmits the voice direction information to the database retrieval module 34, and causes the database retrieval module 34 to retrieve face position information indicating a position near the direction specified by the acquired voice direction information. In addition, the voice direction drive module 36 acquires the counter value indicating the hold time from the hold time module 35. If the counter value is zero, that is, the holding of the imaging range has been finished, and if the face position information has been retrieved, the voice direction drive module 36 controls, on the basis of the face position information and voice direction information, the viewing direction and zoom operation of the camera 10 by controlling the pan/tilt control unit 37 and the zoom control unit 51. If the face position information has not been retrieved, the voice direction drive module 36 controls, on the basis of the voice direction information, the viewing direction and zoom operation of the camera 10 by controlling the pan/tilt control unit 37 and the zoom control unit 51. If the counter value is not zero, that is, the holding of the imaging range has not been finished, the voice direction drive module 36 holds the viewing direction of the camera 10 without controlling the pan/tilt control unit 37 and the zoom control unit 51. If the counter value is smaller than a predetermined value, and if the face position information has been retrieved, the voice direction drive module 36 controls, on the basis of the face position information and the voice direction information, the viewing direction and zoom operation of the camera 10 by controlling the pan/tilt control unit 37 and the zoom control unit 51.

The pan/tilt control unit 37 controls the pan and tilt operations of the pan head 20 by outputting a control signal to the pan head 20 on the basis of a PTZ command transmitted from the command control unit 52 or the control information (Pdeg and Tdeg) transmitted from the voice direction drive module 36. Similarly, the zoom control unit 51 controls the zoom operation of the camera 10 by outputting a control command to the camera 10 on the basis of the PTZ command transmitted from the command control unit 52 or the control information (Zdeg) transmitted from the voice direction drive module 36.

The command control unit 52 generates the PTZ commands on the basis of a key operation signal transmitted from the infrared receiving unit 40, and transmits the PTZ command for the pan and tilt operations and the PTZ command for the zoom operation to the pan/tilt control unit 37 and the zoom control unit 51, respectively.

The remote controller 40a according to this embodiment is provided with PTZ keys for gradually changing pan and tilt directions and a zoom factor. When an input operation is performed using the PTZ keys, a key operation signal indicating the pan and tilt directions and the zoom factor (zoom-in/zoom-out factor) is transmitted to the CPU 50 via the infrared receiving unit 40. The command control unit 52 issues the PTZ commands in accordance with the key operation signal. Consequently, the pan/tilt control unit 37 controls the pan head 20 on the basis of the PTZ command so that the direction of the camera 10 can be gradually changed. The zoom control unit 51 gradually increases or reduces the zoom factor of the camera 10 on the basis of the PTZ command.

The operations of the above-described camera system will be described.

When the camera system is started for use, for example, at the start of a conference, the camera controller 30 performs automatic registration processing for automatically registering face position information in the face position information database 31. More specifically, the camera controller 30 causes the CPU 50 to gradually change the viewing direction of the camera 10, and in parallel, causes the face recognition module 32 to automatically recognize the faces of persons who are in the imaging range of the camera 10, and stores a plurality of pieces of their face position information in the face position information database 31. Thus, a plurality of pieces of face position information about face positions of participants in the conference are stored in the face position information database 31.

When an arbitrary participant starts to speak, the microphone 81 or 82 captures the voice of the participant and outputs a voice signal representative of the voice to the voice signal analyzer 80. The voice signal analyzer 80 predicts the direction from which the voice has emanated on the basis of the voice signal, and generates the voice direction information (Pdeg and Tdeg).

Upon receiving the voice direction information from the voice signal analyzer 80, the camera controller 30 causes the voice direction drive module 36 to start camera direction change processing. The voice direction drive module 36 acquires the hold time from the hold time module 35. In addition, the voice direction drive module 36 transmits the voice direction information to the database retrieval module 34, and causes the database retrieval module 34 to retrieve whether there is face position information indicating the position near the direction specified by the voice direction information. If the hold time has expired, and if the face position information has been retrieved, the voice direction drive module 36 controls, on the basis of the voice direction information and the face position information, the viewing direction and zoom operation of the camera 10 by controlling the pan/tilt control unit 37 and the zoom control unit 51.

If the holding of the imaging range has been finished, and if the face position information has not been retrieved, the voice direction drive module 36 similarly controls the viewing direction and zoom operation of the camera 10 on the basis of the voice direction information. If the holding of the imaging range is being held, and if the face position information has not been retrieved, the voice direction drive module 36 holds the current viewing direction of the camera 10. If the holding of the imaging range is being held, and if the face position information has been retrieved, only when the remaining hold time or the elapsed hold time satisfies a predetermined condition, the voice direction drive module 36 terminates the holding of the imaging range, and controls, on the basis of the voice direction information and the face position information, the viewing direction and zoom operation of the camera 10 by controlling the pan/tilt control unit 37 and the zoom control unit 51.

If the viewing direction of the camera 10 has been changed, the face recognition module 32 determines whether a face is detected in the current imaging range. If a face has been detected, the hold time module 35 sets a long hold time so as to hold the current imaging range. If a face has not been detected, the hold time module 35 sets the hold time to be shorter than that set when a face has been detected so that the imaging range can be moved soon.

By performing the above-described processing, the speaker can be accurately and stably imaged.

If the key operation signal is input into the CPU 50, the key operation signal is assigned higher priority. In this case, even during the hold time, the viewing direction and zoom operation of the camera 10 is controlled in accordance with the key operation signal via the pan/tilt control unit 37 and the zoom control unit 51.

It should be understood by those skilled in the art that various modifications, combinations, sub-combinations and alterations may occur depending on design requirements and other factors insofar as they are within the scope of the appended claims or the equivalents thereof.

What is claimed is:

1. A camera controller for controlling the imaging range of a camera provided with a driver for changing the viewing direction of the camera, the camera controller comprising:

face position detection means for detecting a human face position from an image signal obtained by the camera;

registration means for calculating face direction information on the basis of the result of the detection performed by the face position detection means and information about the current viewing direction of the camera, and registering the calculated face direction information in storage means;

timing means for measuring a hold time for which the viewing direction of the camera is held fixed and the imaging range of the camera is retained;

drive control means for, in a case where the hold time has elapsed before the drive control means has received voice direction information generated by a voice detector for detecting a direction from which the voice of a person to be imaged by the camera is coming, changing the viewing direction of the camera by controlling the driver in accordance with the voice direction information, and in a case where the hold time has not elapsed before the drive control means has received the voice direction information generated by the voice detector for detecting a direction from which the voice of a person to be imaged by the camera is coming, and if a predetermined time has elapsed since a previous movement of the viewing direction changing the viewing direction of the camera by controlling the driver in accordance with the voice direction information; and hold time control means for acquiring the result of the detection performed by the face position detection means, and setting the hold time on the basis of the acquired result of the detection, wherein in a case where the face position detection means has not detected a human face in the imaging range moved in response to the change in the viewing direction of the camera, the hold time is set to be shorter than that set in a case where the face position detection means has detected a human face.

2. The camera controller according to claim 1, wherein the drive control means compares the voice direction information with the face direction information stored in the storage means, and, in a case where a human face has been detected in a direction specified by the voice direction information, performs drive control processing for changing the viewing direction of the camera on the basis of the voice direction information and the face direction information.

3. The camera controller according to claim 1, wherein the drive control means compares the voice direction information with the face direction information stored in the storage means, and shortens the hold time in a case where a human face has been detected in a direction specified by the voice direction information, and performs drive control processing for changing the viewing direction of the camera after the shortened hold time has elapsed.

4. The camera controller according to claim 1, wherein, in a case where a human face has not been detected by the face position detection means in the viewing range corresponding to the voice direction information, the drive control means performs zoom control processing so as to broaden the imaging range.

5. The camera controller according to claim 1, wherein, in a case where the voice direction information has not been acquired from the voice detector within a predetermined time period, the drive control means performs zoom control processing so as to broaden the current imaging range.

6. A teleconferencing system comprising:
a camera system for imaging a plurality of persons;
a voice collector for capturing voices generated by a plurality of persons; and
a transmitter for multiplexing an image signal acquired from the camera system and a voice signal acquired from the voice collector and transmitting a multiplexed signal via a communication line,
the camera system including,
a camera,
a driver for changing the viewing direction of the camera, and
a camera controller for controlling the driver,
the camera controller including,
face position detection means for detecting a human face position from an image signal obtained by the camera;
registration means for calculating face direction information on the basis of the result of the detection performed by the face position detection means and information about the current viewing direction of the camera, and registering the calculated face direction information in storage means,
timing means for measuring a hold time for which the viewing direction of the camera is held fixed and the imaging range of the camera is retained;
drive control means for, in a case where the hold time has elapsed before the drive control means has received voice direction information generated by a voice detector for detecting a direction from which the voice of a person to be imaged by the camera is coming, changing the viewing direction of the camera by controlling the driver in accordance with the voice direction information, and in a case where the time has not elapsed before the drive control means has received the voice direction information generated by the voice detector for detecting a direction from which the voice of a person to be imaged by the camera is coming, and if a predetermined time has elapsed since a previous movement of the viewing direction, changing the viewing direction of the camera by controlling the driver in, accordance with the voice direction information, and
hold time control means for acquiring the result of the detection performed by the face position detection means, and setting the hold time on the basis of the acquired result of the detection,
wherein in a case where the face position detection means has not detected a human face in the imaging range moved in response to the change in the viewing direction of the camera, the hold time is set to be shorter than that set in a case where the face position detection means has detected a human face.

7. A camera controller for controlling the imaging range of a camera provided with a driver for changing the viewing direction of the camera, the camera controller comprising:
a face position detection unit for detecting a human face position from an image signal obtained by the camera;
a registration unit for calculating face direction information on the basis of the result of the detection performed by the face position detection unit and information about the current viewing direction of the camera, and registering the calculated face direction information in a storage unit;
a timing unit for measuring a hold time for which the viewing direction of the camera is held fixed and the imaging range of the camera is retained;
a drive control unit for, in a case where the hold time has elapsed before the drive control unit has received voice direction information generated by a voice detector for detecting a direction from which the voice of a person to be imaged by the camera is coming, changing the viewing direction of the camera by controlling the driver in accordance with the voice direction information, and in a case where the hold time has not elapsed before the drive control means has received the voice direction information generated by the voice detector for detecting a direction from which the voice of a person to be imaged by the camera is coming, and if a predetermined time has elapsed since a previous movement of the viewing direction, changing the viewing direction of the camera by controlling the driver in accordance with the voice direction information; and
a hold time control unit for acquiring the result of the detection performed by the face position detection unit, and setting the hold time on the basis of the acquired result of the detection,
wherein in a case where the face position detection unit has not detected a human face in the imaging range moved in response to the change in the viewing direction of the camera, the hold time is set to be shorter than that set in a case where the face position detection unit has detected a human face.

8. A teleconferencing system comprising:
a camera system for imaging a plurality of persons;
a voice collector for capturing voices generated by a plurality of persons; and
a transmitter for multiplexing an image signal acquired from the camera system and a voice signal acquired from the voice collector and transmitting a multiplexed signal via a communication line,
the camera system including,
a camera,
a driver for changing the viewing direction of the camera, and
a camera controller for controlling the driver,
the camera controller including,
a face position detection unit for detecting a human face position from an image signal obtained by the camera,
a registration unit for calculating face direction information on the basis of the result of the detection performed by the face position detection unit and information about the current viewing direction of the camera, and registering the calculated face direction information in a storage unit, a timing unit for measuring a hold time for which the viewing direction of the camera is held fixed and the imaging range of the camera is retained, a drive control unit for, in a case where the hold time has elapsed before the drive control unit has received voice direction information generated by a voice detector for detecting a direction from which the voice of a person to be imaged by the camera is coming, changing the viewing direction of the camera by controlling the driver in accordance with the voice direction information, and in a case where the hold time has not elapsed before the drive control means has received the voice direction information generated by the voice detector for detecting a direction from which the voice of a person to be imaged by the camera is coming, and if a predetermined time has elapsed since a previous movement of the viewing direction, changing the viewing direction of the camera by controlling the driver in accordance with the voice direction information, and a hold time control unit for acquiring the result of the detection performed by the face position detection unit, and setting the hold time on the basis of the acquired result of the detection, wherein in a case where the face position detection unit has not detected a human face in the imaging range moved in response to the change in the viewing direction of the camera, the hold time is set to be shorter than that set in a case where the face position detection unit has detected a human face.

* * * * *